(12) United States Patent
Kuo et al.

(10) Patent No.: US 7,698,715 B2
(45) Date of Patent: Apr. 13, 2010

(54) EMERGENCY EJECTION DEVICE FOR A SLOT-IN OPTICAL DISK DRIVE

(75) Inventors: Yao-Ting Kuo, Taoyuan County (TW); Yao-Jia Chiou, Taoyuan County (TW); Jen-Chen Wu, Taoyuan County (TW)

(73) Assignee: Quanta Storage Inc., Guishan Shiang, Taoyuan County (TW)

( * ) Notice: Subject to any disclaimer, the term of this patent is extended or adjusted under 35 U.S.C. 154(b) by 623 days.

(21) Appl. No.: 11/564,845

(22) Filed: Nov. 30, 2006

(65) Prior Publication Data

US 2007/0124743 A1    May 31, 2007

(30) Foreign Application Priority Data

Nov. 30, 2005    (TW) .............................. 94142231 A

(51) Int. Cl.
*G11B 17/03* (2006.01)
(52) U.S. Cl. ...................................... 720/601; 720/615
(58) Field of Classification Search .................. 720/600, 720/601, 636, 637, 638, 641, 615, 632
See application file for complete search history.

(56) References Cited

U.S. PATENT DOCUMENTS

| | | | | |
|---|---|---|---|---|
| 6,654,334 | B1 * | 11/2003 | Yamashita et al. | 720/641 |
| 7,533,391 | B2 * | 5/2009 | Wang et al. | 720/601 |
| 2004/0202060 | A1 | 10/2004 | Kuo et al. | |
| 2004/0223420 | A1 * | 11/2004 | Yokota | 369/30.36 |

* cited by examiner

*Primary Examiner*—William J Klimowicz
*Assistant Examiner*—Gustavo Polo
(74) *Attorney, Agent, or Firm*—Winston Hsu

(57) ABSTRACT

An ejection device of a slot-in optical disc drive includes a rotating plate and an elastic unit. The rotating plate is installed on the slot-in optical disc drive and attached to an actuating gear of a feeding gear unit. The actuating gear is capable of following the rotation of the rotating plate to disengage from the feeding gear unit of the slot-in optical disc drive. The elastic unit is attached to the rotating plate to keep the actuating gear engaged with the feeding gear unit. A push wall of the rotating plate and a push block of a sliding piece, connected with the output of the feeding gear unit, are located sequentially on the path of a hole penetrating into the optical disk drive. A stick can be inserted into the hole to activate the ejection device.

7 Claims, 4 Drawing Sheets

EMERGENCY EJECTION DEVICE FOR A SLOT-IN OPTICAL DISK DRIVE

BACKGROUND OF THE INVENTION

1. Field of the Invention

The invention relates to a slot-in optical disc drive, and more particularly, to a slot-in optical disc drive with an ejection device which can eject an optical disc when the optical disc drive is in a breakdown or in a power failure.

2. Description of the Prior Art

Optical disc drives can be divided into tray-type and slot-in-type drives according to how an optical disc is loaded into the optical disc drive. The tray-type optical disc drive loads the optical disc on a tray. When the tray-type optical disc drive fails, triggering a lock apparatus of the tray can eject the tray and the optical disc can be taken off of the tray. On the other hand, the slot-in optical disc drive utilizes a gear unit to drive levers, rollers, or rim bands to eject or insert the optical disc. When the slot-in optical disc drive fails, the optical disc cannot be ejected unless the housing of the optical disc drive is opened. However, opening the delicate slot-in optical disc drive is not easy for users, especially if the slot-in optical disc drive is installed in a car, a computer, or an advanced media apparatus. It may require engineers to open the housing of the slot-in optical disc drive so as to take the optical disc out and cause inconvenience.

To solve inconvenient ejection when the slot-in optical disc drive fails, please refer to FIG. 1 showing the R.O.C. patent application serial number 092108324 (corresponding to U.S. patent publication number 20040202060), titled "DISK FORCE-REJECTION AND FORCE-LOADING DEVICE FOR USE IN AN OPTICAL DISK READING DEVICE." The ejection device 1 according to the prior art includes a power supply unit for providing electric power to a driving unit to rotate a drive gear 2 installed in front of the ejection device 1. The ejection device 1 further includes a control switch 3 for starting or stopping rotation of the driving unit. Then, the drive gear 2 of the ejection device 1 is inserted into an orientation hole 5 in the front of the slot-in optical disc drive 4 to engage the drive gear 2 with an active gear of a motor of the optical disc drive 4 installed nearby the orientation hole 5. By turning on the control switch 3 to rotate the drive gear 2, the drive gear 2 can drive the active gear of the motor of the optical disc drive 4, so that the optical disc is ejected from an entrance 6 of the optical disc drive 4.

The ejection device 1 can force the optical disc drive to eject the optical disc, but the ejection device 1 is a specific tool utilizing electric power to rotate the drive gear 2 and is not widely available for purchase. Users also do not want to spend the extra cost to buy the ejection device 1 and take the ejection device 1 with them. When the optical disc drive fails, the users cannot find the tool immediately so they will send the optical disc drive back for repair. For engineers, if they do not have the ejection device 1, they will open the housing of the optical disc drive to take the optical disc out. Without the ejection device 1, taking the optical disc out is still inconvenient for the slot-in optical disc drive when the optical disc drive fails.

Moreover, the slot-in optical disc drive according to the prior art drives the optical disc by many gear units, so the difference of the torque between the output of the gear units and the difference of the rotating speed are large. More electric power and time are required for the ejection device to drive the active gear of the motor and the gear of the slot-in optical disc drive. Therefore, the ejection device of the slot-in optical disc drive according to the prior art should be improved.

SUMMARY OF THE INVENTION

One objective of the present invention is therefore to provide a slot-in optical disc drive with an ejection device which can conveniently utilize a general tool to eject the optical disc without electric power.

Another objective of the present invention is to provide a slot-in optical disc drive with an ejection device with a simple structure to reduce a torque of a feeding gear unit of the ejection for convenient operation.

Another objective of the present invention is to provide a slot-in optical disc drive with an ejection device which can directly drive a sliding piece of the optical disc drive so as to eject the optical disc immediately.

To achieve the above-mentioned objectives, the present invention provides an ejection device of a slot-in optical disc drive comprising a rotating plate installed on the slot-in optical disc drive and attached to an actuating gear of a feeding gear unit, the actuating gear capable of following the rotation of the rotating plate to disengage from the feeding gear unit of the slot-in optical disc drive, and an elastic unit attached to the rotating plate to keep the actuating gear engaged with the feeding gear unit.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
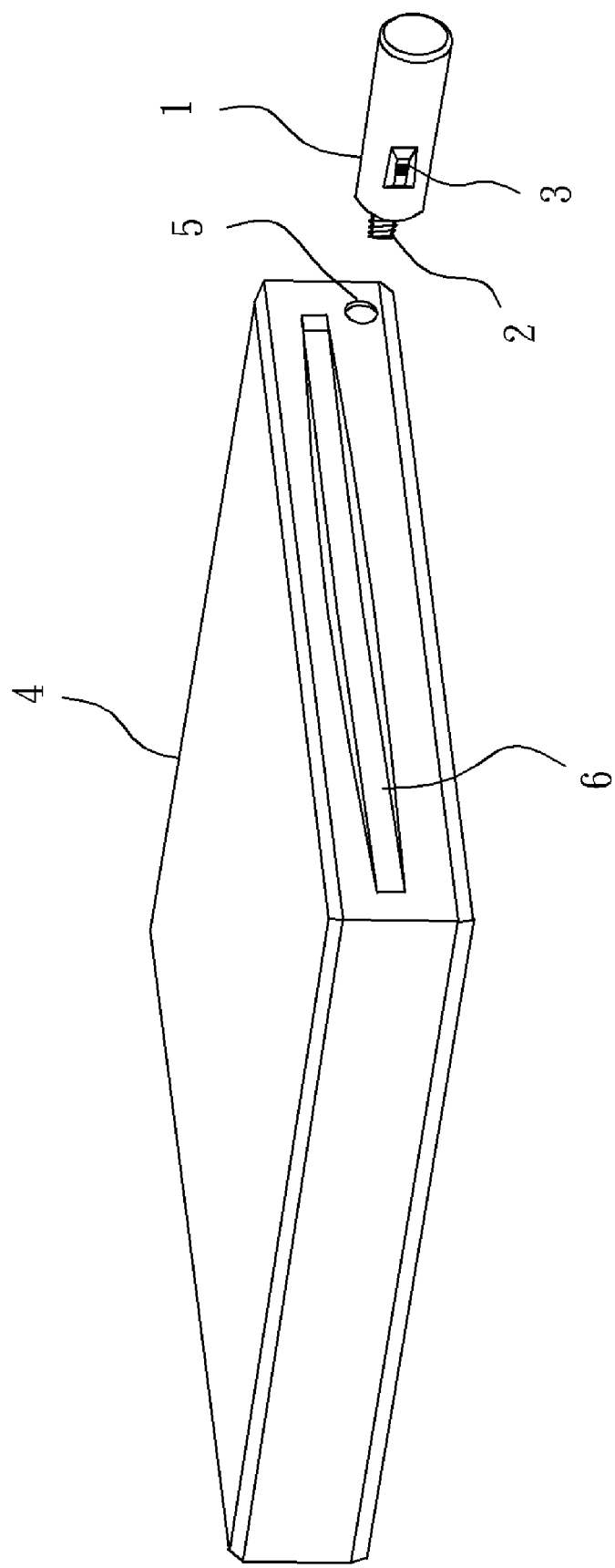
FIG. 1 is a perspective view of utilizing an ejection device of a slot-in optical disc drive according to the prior art.
Figure 2:
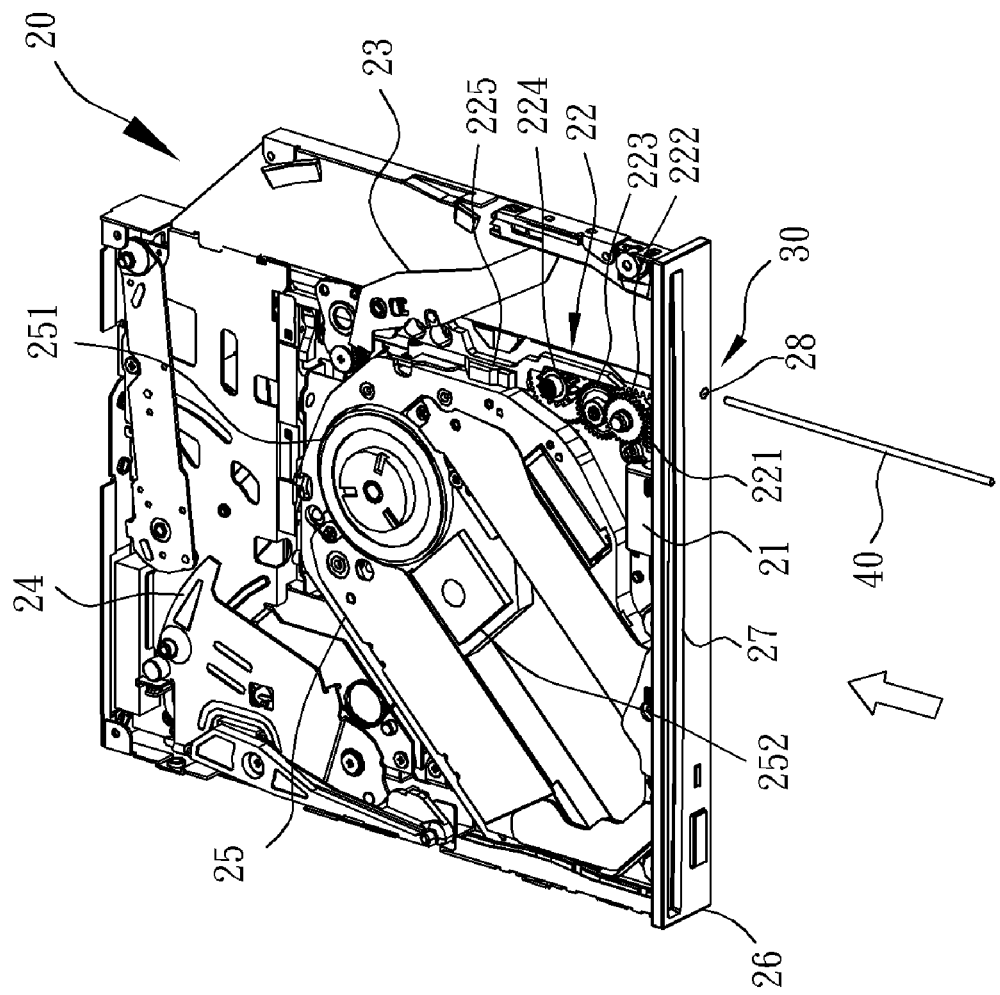
FIG. 2 is a perspective view of a slot-in optical disc drive with an ejection device according to the present invention.

Please refer to FIG. 2 showing an ejection device 30 of a slot-in optical disc drive 20 according to the present invention. The slot-in optical disc drive 20 includes a drive motor 21, a feeding gear unit 22, a guide apparatus 23, an orientation apparatus 24, and a traverse 25. An optical disc (not shown) is inserted into an entrance 27 of a panel 26 as indicated. When the slot-in optical disc drive 20 detects the optical disc, the optical disc drive 20 starts the drive motor 21 to rotate the feeding gear unit 22. The drive motor 21 drives a worm gear 221, a first gear 222, a second gear 223, and a third gear 224 in a sequence. Then, the third gear 224 drives a rack of a sliding piece 225 so that the sliding piece 225 moves in reciprocation to swing a lever of the guide apparatus 23. The lever pushes the edge of the optical disc so that the front of the optical disc can reach the orientation apparatus 24 and the center hole of the optical disc can be guided. The feeding gear unit 22 drives the orientation apparatus 24 inward so as to locate the center hole of the optical disc over the spindle motor 251 of the traverse 25. The feeding gear unit 22 drives the traverse 25 upward along a groove (not shown) until the spindle motor 251 clamps the center hole of the optical disc. The spindle motor 251 rotates the optical disc and a pickup head 252 of the traverse 25 reads data of the optical disc.

When ejecting the optical disc, the drive motor 21 drives the feeding gear unit 22 to rotate in a reverse direction. The traverse 25 is driven downward and the spindle motor 251 departs from the center hole of the optical disc. The orientation apparatus 24 drives the optical disc to the entrance 27 in the front of the slot-in optical disc drive 20 so that the optical disc can be taken out. The optical disc loading of the slot-in optical disc drive 20 is simply illustrated as above. Please refer to the prior art for more details regarding how the drive motor rotates the feeding gear unit 22 to drive the optical disc.

Figure 3:
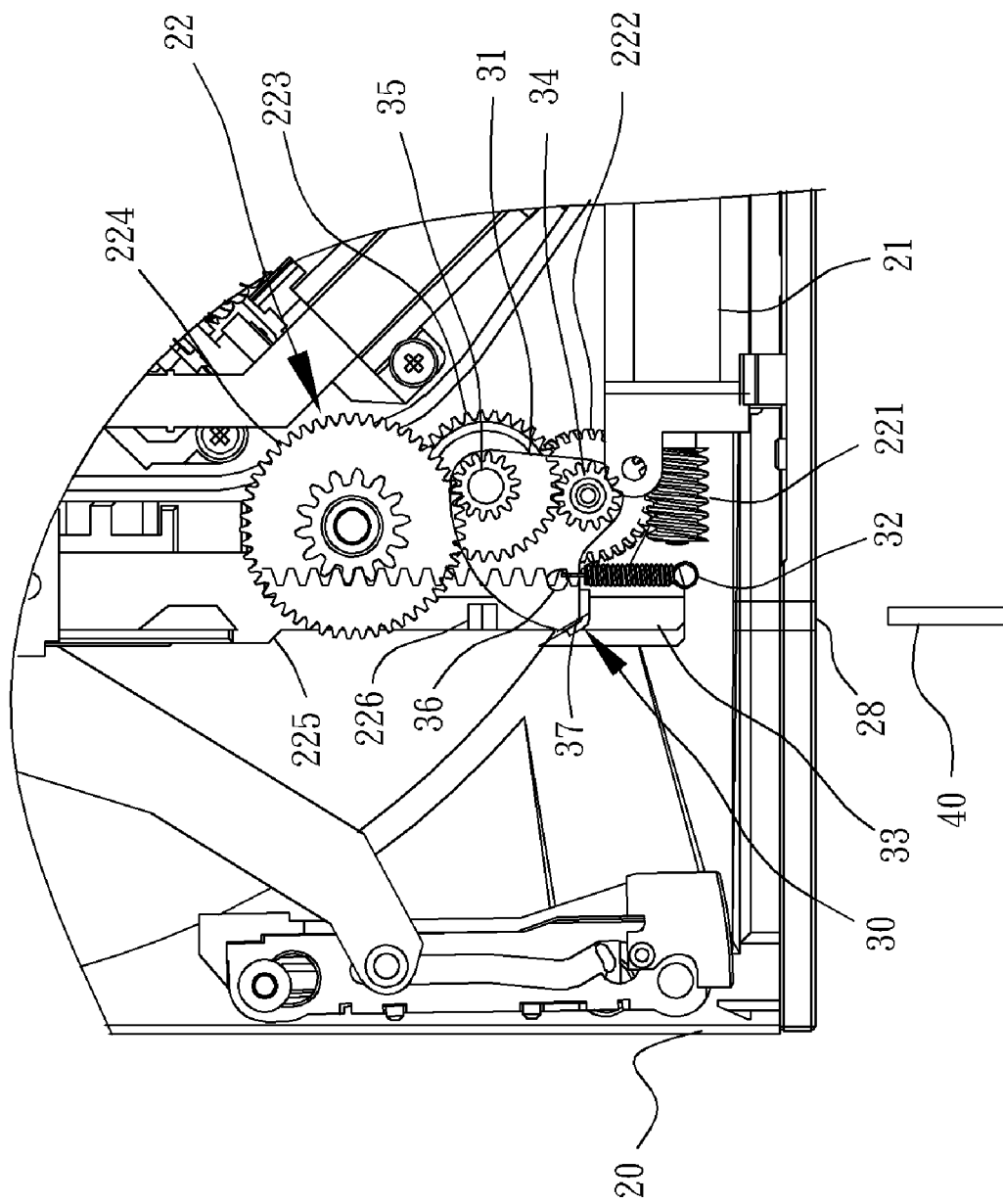
FIG. 3 is an enlarged view of the ejection device of the slot-in optical disc drive in the FIG. 2.

The ejection device 30 according to the present invention is installed in the slot-in optical disc drive 20 and near to the feeding gear unit 22. For convenient adjustment, the ejection device 30 is installed in the front of the slot-in optical disc drive 20 in this embodiment. A hole 28 is formed in the front of a panel 26 of the slot-in optical disc drive 20, which is near to the feeding gear unit 22. A thin stick 40 can be inserted into the hole 28 to trigger the ejection device 30 installed in the slot-in optical disc drive 20 according to the present invention. Please refer to FIG. 3 showing an enlarged view of the back of the feeding gear unit 22 of the slot-in optical disc drive 20. The first gear 222, the second gear 223, and the third gear 224 include a large gear and a small gear respectively. The large gear and the small gear are engaged with each other. The large gear of the first gear 222 engages with the worm gear 221 of the drive motor 21, and the small gear of the third gear 224 engages with the rack of the sliding piece 225. The axles of the first gear 222 and the third gear 224 are fixed in the slot-in optical disc drive 20. The ejection device 30 according to the present invention is installed in the back of the feeding gear unit 22, and includes a rotating plate 31, an elastic unit 32, and a groove 33. The rotating plate 31 has a first fixing hole 34, a second fixing hole 35, and a support hole 36 arranged in proper intervals. The first fixing hole 34 is mounted on the axle of the first gear 222. The first gear 222 can rotate, and is installed on the slot-in optical disc drive 20, so that the rotating plate 31 can rotate around the first fixing hole 34. The axle of the second gear 223 is fixed in the second fixing hole 35 so that the second gear 223 can move with the second fixing hole 35 as an actuating gear moving around the first fixing hole 34. The large gear of the second gear 223 always engages with the small gear of the first gear 222 when the second gear 223 moves.

In addition, one end of the elastic unit 32 of the ejection device 30 is fixed on the slot-in optical disc drive 20, and the other end is attached to the support hole 36. Because the elastic unit 32 pulls the support hole 36, the ejection device 30 can use the first fixing hole 34 as a fulcrum so that the second gear 223 can engage the first gear 222 and third gear 224 closely. On the other hand, the ejection device 30 resists the force of the elastic unit 32 so that the small gear of the second gear 223 can disengage from the third gear 224. The rotating plate 31 has a push wall 37 formed on the edge, and the push wall 37 can be formed by bending the edge of the rotating plate 31. The push wall 37 is located in the path of the stick 40 inserted into the hole 28, and can be pushed by the stick 40 to rotate the rotating plate 31. In addition, the hole 28 can guide the stick 40 to push the push wall 37, and the groove 33 formed on the path of the stick 40 inserted into the hole 28 and extending to one end of the sliding piece 225 can also guide the stick 40 to push the push wall 37 until it reaches a push block 226 of the sliding piece 225.

Figure 4:
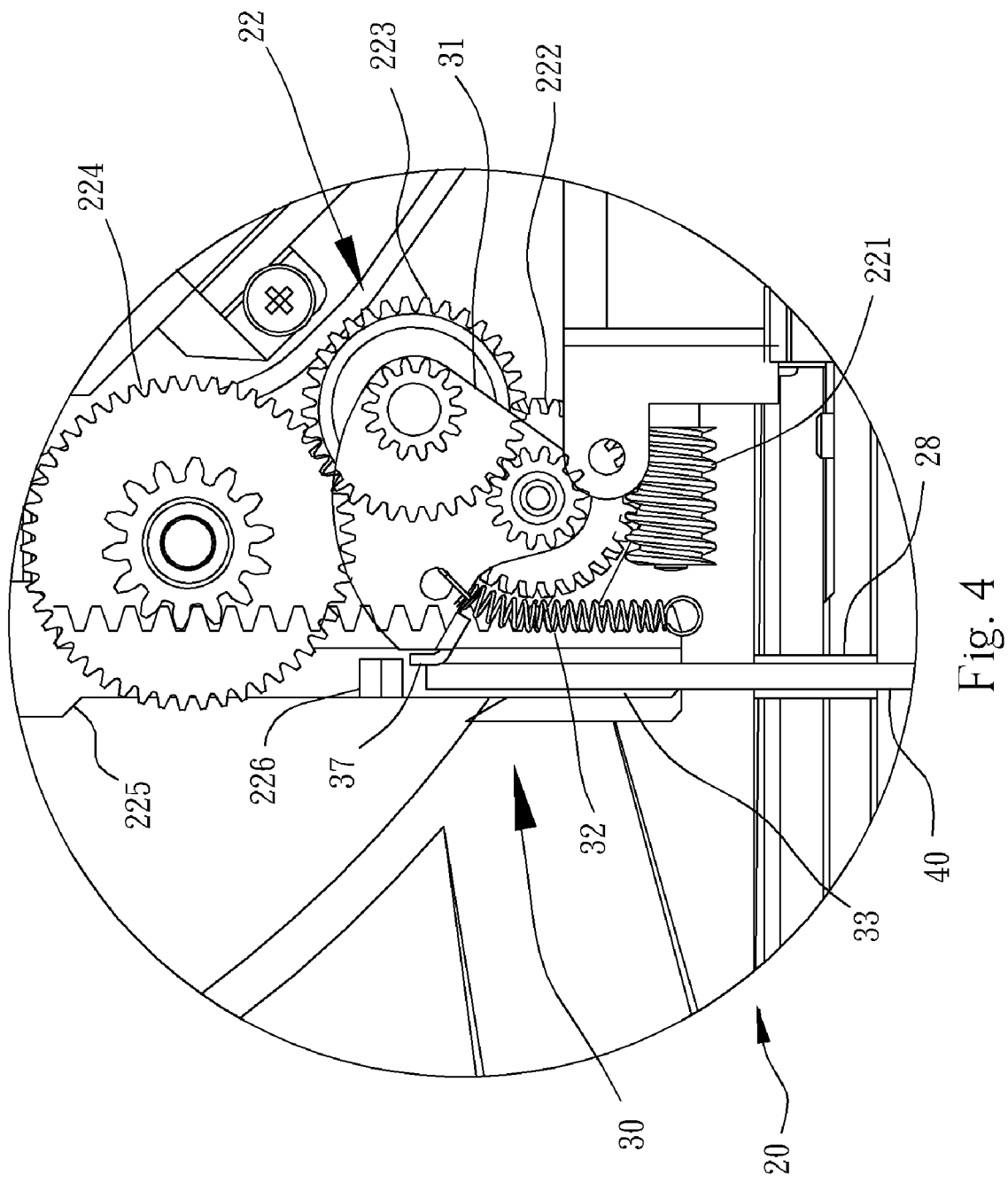
FIG. 4 illustrates enabling the ejection device of the slot-in optical disc drive in the FIG. 2.

Please refer to FIG. 4. FIG. 4 illustrates enabling the ejection device 30. When the slot-in optical disc drive 20 is in a breakdown or in a power failure, for taking the optical disc out immediately, the stick 40 is inserted into the hole 28. With guidance from the hole 28 and the groove 33, the stick 40 will reach the push wall 37 and push the push wall 37 so that the rotating plate 31 can resist the force of the elastic unit 32 to rotate around the first gear 222. Then, the small gear of the second gear 223 disengages from the third gear 224 so as to reduce the number of gears driven to eject the optical disc and break up the resistance of gears having a low rotation rate and large torque, such as the worm gear 221, so that the force of the ejection can be reduced. The stick 40 is held to disengage the second gear 223 from the third gear 224 until the stick 40 reaches the push block 226 of the sliding piece 225, and the stick 40 is utilized to push the push block 226 to drive the sliding piece 225. At this time, the sliding piece 225 only needs to rotate the third gear 224 of the feeding gear unit 22, so that force and time are saved. Moving the sliding piece 225 can directly drive the traverse 25 downward to disengage the spindle motor 251 from the optical disc and drive the orientation apparatus 24 to eject the optical disc. Therefore, the optical disc can be ejected immediately.

By means of the ejection device 30 of the slot-in optical disc drive 20 according to the present invention, the user can utilize a general tool instead of the specific electric tool of the prior art to eject the optical disc immediately when the optical disc drive 20 fails. Moreover, the ejection device 30 has a small and simple structure, so the ejection device 30 needs less cost and less space and can be applied to more types of optical disc drives. In addition, the ejection device 30 utilizes the ejection device to break up the resistance of the gears having low rotation rate and large torque so as to reduce the force of the ejection for convenient operation. The ejection device utilizes the stick 40 to drive the sliding piece 225, so that the resistance of the feeding gear unit 22 can be reduced, and the traverse 25 and the orientation apparatus 24 are directly driven to eject the optical disc.

As mentioned above, the ejection device according to the present invention is illustrated by utilizing the lever to drive the optical disc in the slot-in optical disc drive. However, the slot-in optical disc drive is not a restriction of the present invention. For example, a slot-in optical disc drive utilizing the feeding gear unit to drive levers, rollers, or rim bands to eject or insert the optical disc is also applicable. Furthermore, if the slot-in optical disc drive is designed to drive in a different direction, the ejection device can be modified to adapt; for example, the stick pushing the sliding piece can be changed to pull the sliding piece.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An ejection device of a slot-in optical disc drive comprising: a rotating plate rotatably installed on the slot-in optical disc drive, and attached to an actuating gear of a feeding gear unit, the actuating gear capable of following the rotation of the rotating plate to disengage from the feeding gear unit of the slot-in optical disc drive; a push wall disposed on the rotating plate and located on a path of a hole penetrating the optical disc drive; a sliding piece attached to the feeding gear unit and located on the path of the hole and following the push wall; and an elastic unit attached to the rotating plate to keep the actuating gear engaged with the feeding gear unit; wherein when a stick is inserted into the hole, the stick reaches the push wall and pushes the sliding piece to complete an optical disc ejection; wherein the rotating plate comprises a first fixing hole for fixing the rotating plate on the slot-in optical disc drive and a second fixing hole for fixing the actuating gear; wherein the feeding gear unit comprises a first gear, the actuating gear, and a third gear, and the first gear and the third gear are fixed on the slot-in optical disc drive.

2. The ejection device of claim 1, wherein the push wall is a bent edge of the rotating plate.

3. The ejection device of claim 1, further comprising a groove formed on the path of the hole to the sliding piece.

4. The ejection device of claim 1, wherein the sliding piece comprises a push block located on the path of the hole.

5. The ejection device of claim 1, wherein the actuating gear initially engages with the first gear and the third gear, and the rotating plate is fixed by the first fixing hole with the first gear on the slot-in optical disc drive so that the actuating gear still engages with the first gear and disengages from the third gear when the stick is inserted into the hole.

6. The ejection device of claim 1, wherein the rotating plate comprises a support hole for attaching the elastic unit.

7. The ejection device of claim 1, wherein the rotating plate is installed on the backside of the feeding gear unit.

* * * * *